Jan. 11, 1966  L. COATES  3,228,177
SAFETY DEVICE FOR POWER EQUIPMENT
Filed July 29, 1964  2 Sheets-Sheet 1
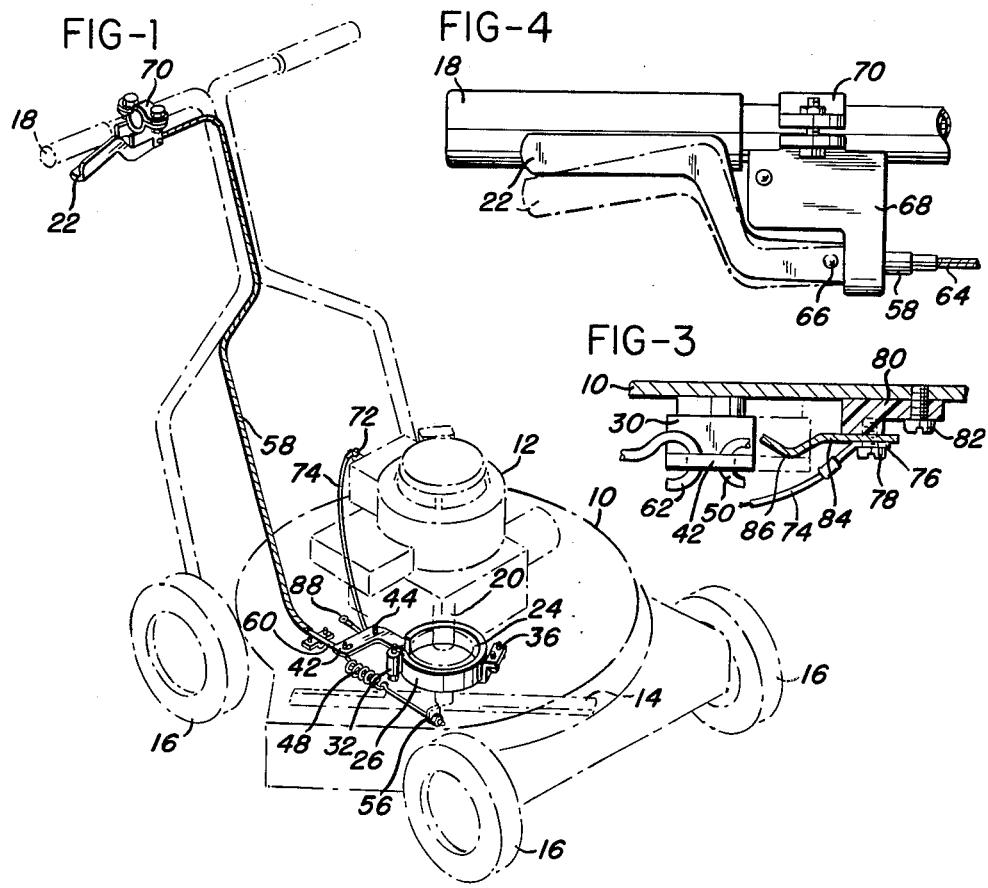
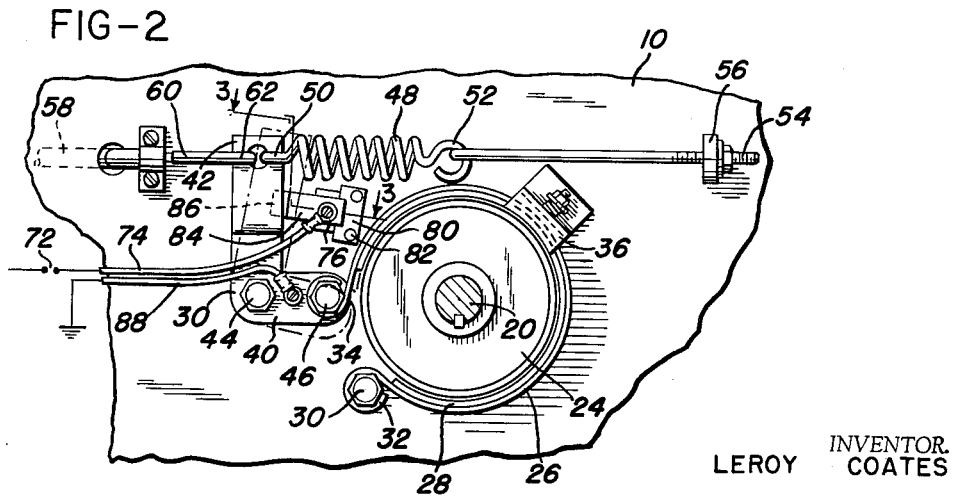
INVENTOR.
LEROY COATES
BY *Kinney and Schenk*
ATTORNEYS Jan. 11, 1966 L. COATES 3,228,177
SAFETY DEVICE FOR POWER EQUIPMENT
Filed July 29, 1964 2 Sheets-Sheet 2
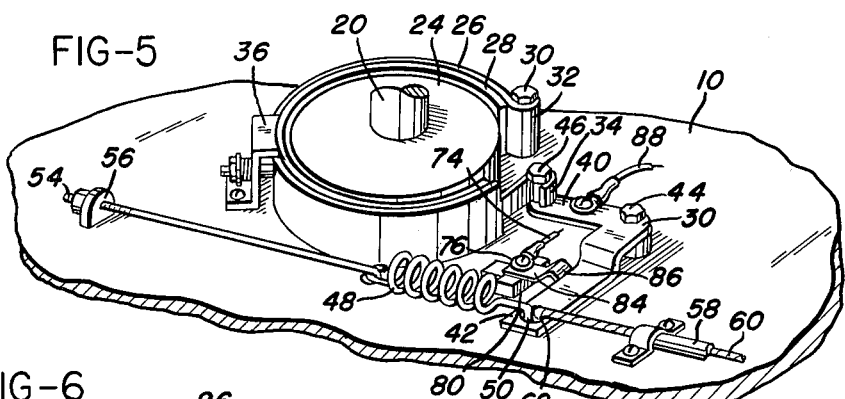
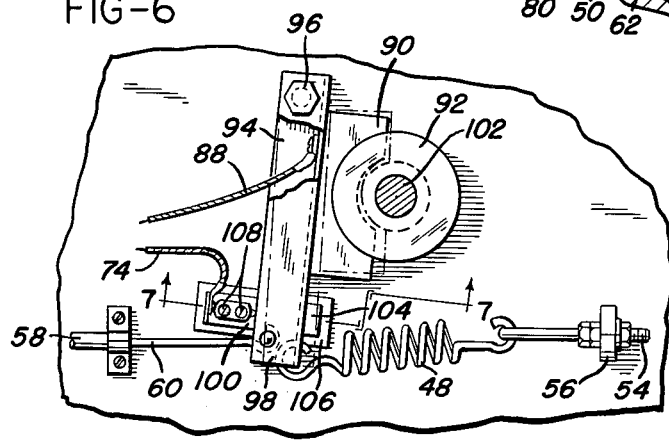
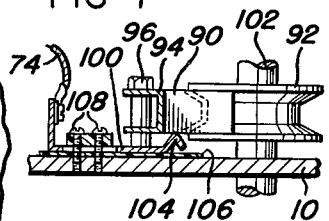
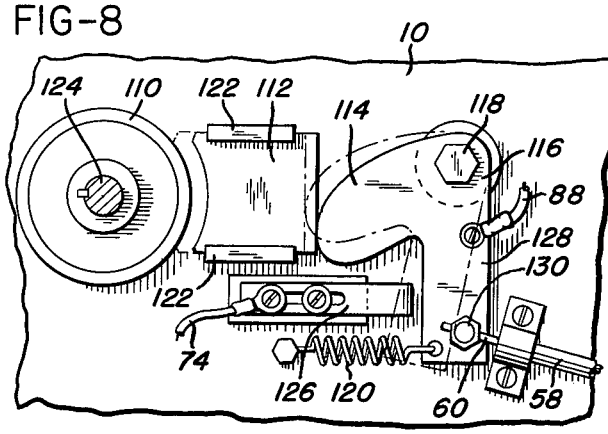
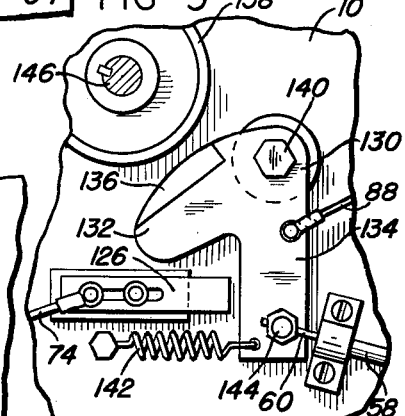
INVENTOR.
LEROY COATES
BY
Kinney & Schenk
ATTORNEYS United States Patent Office 3,228,177
Patented Jan. 11, 1966

3,228,177
SAFETY DEVICE FOR POWER EQUIPMENT
Leroy Coates, 2708 Birch St., Covington, Ky.
Filed July 29, 1964, Ser. No. 385,877
2 Claims. (Cl. 56—25.4)

The present invention relates to a safety device for power equipment of a type which requires human operation or guidance, and which under certain conditions or circumstances poses a threat of serious injury to the operator. Such equipment usually comprises a cutter of one form or another, and a motor for actuating the cutter.

Power equipment of the general character referred to may be obtained in various forms, for performing a variety of services or duties. The most popular equipment in present use is the power mower or mulcher, which may include either an internal combustion engine, or an electric motor, arranged to activate a cutter which may consist of one or more rapidly rotating blades, a cutting reel, or a reciprocating sickle blade.

By way of example, the present disclosure is directed to an item of power equipment referred to as a power mower of the rotary blade type, powered by an internal combustion engine or motor. As the description proceeds, it will become evident that the present invention is readily applicable to other types of power equipment incorporating moving parts which may be braked, or disabled, in a fashion similar to that herein disclosed by way of example. It is therefore considered superfluous to illustrate and describe herein the many forms of power equipment which might be controlled by the safety device of the invention.

An object of the invention is to provide means automatically operative to maintain a disabled condition of the equipment at all times other than when the equipment is under proper control of the operator.

Another object of the invention is to provide means for automatically nullifying the power of the motor and braking the cutter to a stop, promptly and reliably, whenever the operator fails to maintain pressure upon a manual control member conveniently located at the operator's station.

A further object of the invention is to provide durable means for the purpose stated, which is simple and effective of performance, and which in repeated operation imparts no injurious or damaging strain or premature wear upon essential parts of the equipment.

Another object is to provide a safety device for the purpose stated, which may simply and easily be installed upon existing power equipment, or upon power equipment in process of manufacture and assembly.

The foregoing and other objects are attained by the means described herein, and illustrated upon the accompanying drawings, in which:

FIG. 1 is a phantom perspective view of a typical power mower of the rotary blade type, incorporating a safety device of the invention.

FIG. 2 is a bottom view taken through the motor shaft, showing the safety device in plan.

FIG. 3 is an enlarged cross section taken on line 3—3 of FIG. 2.

FIG. 4 is an elevational view of a manual control member on the mower handle.

FIG. 5 is a perspective view of the FIG. 2 structure.

FIG. 6 is a plan view of the safety device in modified form.

FIG. 7 is a fragmental cross-section taken on line 7—7 of FIG. 6.

FIG. 8 is a plan view of a second modification of the safety device.

FIG. 9 is a plan view of a third modification of the safety device.

The typical rotary-blade power mower generally comprises a support in the form of a platform or housing 10, upon which is mounted a motor 12 arranged to rapidly rotate a cutter or blade 14 disposed beneath the support or platform. The platform is furnished with two or more wheels 16, and may be guided in its path of travel by means of a handle 18 connected thereto. A drive shaft 20 projected vertically through the platform, serves to support and rotate cutter 14, which is detachably secured to the shaft at its lower end. Shaft 20 may be the crankshaft of motor 12, or it may be a separate shaft driven by belt or otherwise from the motor shaft. In the example illustrated, drive shaft 20 is the crankshaft of motor 12.

It is a fact well known, that persons using mowers of the type shown have suffered severe injuries by reason of accidental contact with the rotary cutter after slipping or tripping while guiding the mower by means of handle 18. Others have been injured by unexpected starting of the motor resulting from moving the cutter while cleaning or making adjustments or repairs on the mower. To overcome such hazards, the present invention proposes to brake or immobilize the cutter, and to disable the ignition system of the motor, automatically, whenever the operator is not applying pressure upon a lever or control member 22 attached to handle 18. Under this arrangement, anyone may safely manipulate, adjust, or clean any part of the mower while it is out of service, providing that control member 22 is not under depression. Similarly, danger is averted the moment the operator loses control of the mower handle while the mower is in service, since release of member 22 immediately brings into operation the cutter brake and the motor ignition system cut-off.

Referring to FIGS. 1 to 5, the numeral 24 indicates a brake drum fixed upon cutter shaft 20, and about said drum is arranged a brake band 26 which may carry a suitable frictional liner 28. A post 30 fixed to support 10 anchors one end 32 of the brake band. The opposite end 34 of the brake band is shiftable toward post 30 for contracting the band about drum 24, to immobilize shaft 20 and the cutter attached thereto. The numeral 36 indicates a guide suitably arranged to preclude displacement of the band laterally from the brake drum.

A brake band shifter 38 may take the form of a bell crank having divergent arms 40 and 42, and at the intersection of said arms the shifter may be pivoted to a post or bolt 44 which is anchored to support 10. A stud 46 on arm 40 has connection with the end 34 of brake band 26, so that band 26 may be contracted about the brake drum by rotating the shifter 38 in clockwise direction about pivot post 44. A torsion spring 48 tends constantly to so contract the brake band about the drum. The spring accordingly may have one end 50 connected to the free end of arm 42, while the opposite end 52 is fixed relative to support or platform 10, preferably through the intermediary of an adjusting rod 54 passing through an upstanding lug 56 on the support. The force of spring 48 thereby may be varied for adjusting the braking force of band 26.

While the mower is in use, the brake band is of course to be relaxed to permit free rotation of cutter shaft 20. This may be accomplished by means of a flexible cable 58 or equivalent motion transmission means, the shiftable core 60 of which may have one end 62 attached to the free end of arm 42, while the opposite end 64 is attached to lever or control member 22. Lever 22 may be pivoted at 66 upon a bracket 68 clamped as at 70 upon handle 18, the arrangement being such that when lever 22 is held to the full-line position of FIG. 4, the cable pulls arm 42 to the left (FIG. 2), to stretch spring 48 and expand the brake band 26 for release of drum 24.

As long as an operator grasps handle 18 and holds lever 22 in close juxtaposition thereto, the brake associated with the cutter shaft will be in released condition; however, should the operator for any reason fail to hold lever 22 against handle 18, spring 48 will immediately act to rotate member 30 in clockwise direction about pivot 44, to set the brake and stop rotation of shaft 20. It will therefore be understood that whenever the mower is not in service, the cutter shaft will be locked against rotation by the action of spring 48.

As was previously mentioned herein, application of the brake is accompanied by a disabling of the motor ignition system. This is best accomplished by grounding or short-circuiting the hot terminal of the spark plug. As FIG. 1 indicates, the hot terminal of spark plug 72 has connection with one end of a conductor 74, the opposite end 76 of which is screwed as at 78 to an insulator block 80. Block 80 may be fixed to support 10 by means of screw 82.

In electrical contact with conductor end 76 is a metallic brush or switch member 84, having a contact end 86 in position to be struck by arm 42 whenever spring 48 acts to rotate paid arm in clockwise direction, that is, whenever the operator releases his grip on lever 22. Arm 42, being itself grounded through pivot bolt 44 to the metallic platform 10, serves to ground conductor 74 and the hot terminal of spark plug 72, to disable the ignition system of the motor. To assure that arm 42 is properly grounded, it may be connected by means of an auxiliary ground wire 88 to the platform 10, or preferably, to the cylinder block of motor 12. It will be understood, of course, that the hot terminal of spark plug 72 has the usual electrical connection with the hot line of the magneto or other source of electric for motor 12.

In the preferred arrangement, switch member or brush 84 is so located with relation to arm 42, that grounding of the spark plug precedes application of the brake to cutter shaft 20. Thus, the motor 12 is never under power when the brake is applied to shaft 20, with the result that strain and wear of parts is held to a minimum.

The modification, FIGS. 6 and 7, utilizes the spring 48 for yieldingly urging a brake shoe 90 into braking relationship with a pulley 92. Here, the brake shoe is fixed to an arm 94 of metal, the arm being pivoted at one end thereof upon support 10, by means of screw 96. The opposite free end 98 of the arm has connection with spring 48, and with the flexible cable 60 controlled by a lever such as 22, FIG. 4. The auxiliary ground wire for arm 94 of metal, the arm being pivoted at one end thereof upon support 10, by means of screw 96. The opposite free end 98 of the arm has connection with spring 48, and with the flexible cable 60 controlled by a lever such as 22, FIG. 4. The auxiliary ground wire for arm 94 is indicated at 88, and 74 indicates the grounding conductor leading from brush or switch member 100 to the hot terminal of the motor spark plug, all as previously explained.

In the arrangement of FIGS. 6 and 7, brake shoe 90 may consist of a simple block of friction material, such as a soft metal, wood, fiber, composition or the like, which may be fitted to the groove of pulley 92. The shaft 102 upon which pulley 92 is fixed, may be a shaft other than the motor shaft, or it may be the motor shaft in some mower constructions. It will, however, be a drive shaft in the sense that it directly or indirectly imparts rotation to a cutter. In any event, shaft 102 is one that may be braked for stopping rotation of a cutter.

Switch member or brush 100 has an upstanding end 104 to be contacted by arm 94 whenever spring 48 pulls the arm toward pulley 92, thereby resulting in grounding and disabling the motor spark plug. Brush member 100 may rest upon a dielectric pad 106 attached to platform 10 by screws 108, said member 100 being thereby electrically insulated from the platform. As in the case of FIGS. 1 to 5, a release of control member or lever 22 permits the spring 48 of FIG. 6 to ground the spark plug terminal at 104, and then promptly apply the brake to pulley 92 for stopping rotation of shaft 102 and any cutter associated therewith. Broken lines on FIG. 6 show the brake shoe 90 in braking position.

The FIG. 8 modification differs from FIG. 6, in that the pulley or brake drum 110 is braked by a linearly movable shoe 112, which is driven against the rotating member by action of a cam element 114. The cam element may be part of a bell crank 116 pivoted at 118 upon support or platform 10. When bell crank 116 is rotated clockwise about its pivot 118, by the action of spring 120, the cam portion 114 moves to the broken line position shown, for advancing the brake shoe 112 in its guides 122. The shaft 124, keyed to drum or pulley 110, is one which imparts rotation to a cutter, either directly or indirectly.

The switch element or brush 126 may be structurally and functionally the same as element 100 of FIG. 6, and will ground the motor spark plug when contacted by the arm 128 of cam element 116. As in the structures previously described, the core element 60 of a flexible cable 58 has one end fixed to arm 128 at 130, while the opposite end thereof has connection with a lever or control member 22 as shown by FIG. 4. Whenever member 22 is free of restraint, spring 120 will act to swing arm 128 to the left, thereby grounding the spark plug wire 74 through said arm or through the auxiliary grounding wire 88, and cam 114 will then proceed to force the brake shoe against pulley or drum 110. Spring 120 may be adjustable as in FIG. 6, if desired.

The FIG. 9 modification employs a bell crank 130 having divergent arms 132 and 134, of which arm 132 carries a brake pad or shoe 136 to brake the pulley or drum 138. At the intersection of the arms, a screw or the like 140 pivots the bell crank upon support 10, as that spring 142 attached to arm 134 may tend constantly to advance the shoe toward braking position.

Shoe 136 may be held out of contact with drum or pulley 138 by the means of FIG. 4, including the flexible cable means 58 previously described in detail. The core element 60 of the flexible cable means may be fixed to arm 134 at the location 144.

The switch element or brush 126 of FIG. 8 is duplicated upon FIG. 9, and functions to ground the motor spark plug when arm 134 strikes the switch element or brush, as previously explained. As in the structures previously described, release of the control lever 22 by the operator, permits pring 142 to swing bell crank 130 in clockwise direction of rotation, for grounding the spark plug hot terminal and then applying the brake to drum or pulley 138. Drum or pulley 138 is keyed to a shaft 146 which either directly or indirectly imparts rotation to a cutter such as 14 of FIG. 1. As will be understood, brake 136 will be withdrawn, and the motor for the equipment will continue to function, as long as the operator holds lever 22 against handle 18.

It may be noted that the braking means and the electrical grounding means of each structure herein disclosed, may be applied directly to platform 10, or in the alternative, these mechanisms may be built into a separate housing to be mounted upon the platform as a safety unit assembly insertable between the platform and the driving motor. Also, the safety device of the invention may be applied to some types of self-propelled equipment, for braking the driving wheels while disabling the driving motor.

It is to be understood that various modifications and changes may be made in the structural details of the apparatus, within the scope of the appended claims, without departing from the spirit of the invention; and in this connection it should be understood that it is contemplated that the flywheel of the engine of a rotary mower would have or be provided with a peripheral surface engageable by the braking shoe.

What is claimed is:

1. Power mower equipment which comprises in combination: a tractional support including a handle for manually directing the tractional support over a surface, an internal combustion engine mounted upon the support and including an electrical ignitor, a source of electric current, and a conductor directing current from the source to said ignitor, a drive shaft mounted for rotation relative to the support, and means transmitting motion of the engine to said drive shaft, a movable blade beneath the support, and means for transmitting motion of the drive shaft to said blade, a brake selectively operative upon said drive shaft to immobilize the latter, an electric current diverter comprising bell crank lever having divergent arms, said lever being pivoted at the juncture of said arms and means contacting one of said arms for selectively shunting electric current from the ignitor of the engine to disable the ignitor, yielding means connected to the free end of one of said arms normally applying the brake to said drive shaft wille at the same time actuating the diverter to divert current away from the ignitor, a shiftable control member on the handle to be grasped and held in restraint by an operator concidentally with grasping said handle, and means associated with the control member and connecting it to said free end of one of said arms for overcoming the force of said yielding means while the control member is under restraint, to effect release of the brake and deactivate the current diverter.

2. Power equipment which comprises in combination: a tractional support including a handle for manually directing the tractional support over a surface, an internal combustion engine mounted upon the support and including an electrical ignitor and an upright drive shaft, a source of electric current, and a conductor directing current from the source to said ignitor, a work-performing implement fixed to the drive shaft for rotation therewith beneath the support, a brake drum fixed upon said shaft, a brake band trained about the drum and contractible thereon to immobilize the drive shaft and the implement aforesaid, a movable brake band shifter comprising a bell crank lever having divergent arms, said lever being pivoted at the juncture of said arms for movement relative to the support from a normal position to an abnormal position, yielding means connected to the free end of one of said arms tending constantly to move the shifter to the normal position, a connecting means between the free end of the other of said arms and the brake band operative to contract the band about the drum in the normal position of the band shifter, and to expand the band to release the drum in the abnormal position of the band shifter, a shiftable control member on the handle to be grasped and held in restraint or by operator coincidentally with grasping said handle, means connecting said handle to the free end of said one of said arms operative upon movement of the control member to the position of restraint, for moving and holding the brake band shifter in the abnormal position in opposition to the force of the yielding means, and an electric current diverter operative to contact one of said arms as the band shifter moves toward the normal position of braking, for grounding the current from the ignitor of the engine.

References Cited by the Examiner
UNITED STATES PATENTS

| | | | |
|---|---|---|---|
| 1,033,519 | 7/1912 | Banzhof | 192—2 |
| 2,985,992 | 5/1961 | Dowdle | 56—25.4 |
| 3,015,237 | 1/1962 | Musgrave | 56—25.4 X |
| 3,026,665 | 3/1962 | Hoff | 56—25.4 |
| 3,028,717 | 4/1862 | West | 56—25.4 |
| 3,093,948 | 6/1963 | Root | 56—25.4 |
| 3,111,800 | 11/1963 | Quianthy | 56—25.4 |
| 3,142,950 | 8/1964 | West | 56—25.4 |
| 3,169,358 | 2/1965 | Ertsgaard et al. | 56—25.4 |

ABRAHAM G. STONE, *Primary Examiner.*

RUSSELL R. KINSEY, M. C. PAYDEN,
*Assistant Examiners.*